United States Patent
Patka et al.

(10) Patent No.: US 12,457,650 B2
(45) Date of Patent: Oct. 28, 2025

(54) DEVICE DETECTION AND NETWORK SLICE ASSIGNMENT SERVICE

(71) Applicant: Verizon Patent and Licensing Inc., Basking Ridge, NJ (US)

(72) Inventors: Andrew F. Patka, Holliston, MA (US); Seng Gan, Ashburn, VA (US); Sankar Subramanian, Ossining, NY (US); John C. Burlison, Sherwood, AR (US); Rajendra K. Damle, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 400 days.

(21) Appl. No.: 18/062,939

(22) Filed: Dec. 7, 2022

(65) Prior Publication Data
US 2024/0196450 A1 Jun. 13, 2024

(51) Int. Cl.
*H04W 76/11* (2018.01)
*H04L 61/5014* (2022.01)
*H04W 12/08* (2021.01)
*H04W 48/18* (2009.01)

(52) U.S. Cl.
CPC ......... *H04W 76/11* (2018.02); *H04L 61/5014* (2022.05); *H04W 12/08* (2013.01); *H04W 48/18* (2013.01)

(58) Field of Classification Search
CPC ..... H04W 76/11; H04W 12/08; H04W 48/18; H04L 61/5014
USPC .......................................................... 370/328
See application file for complete search history.

(56) References Cited

U.S. PATENT DOCUMENTS

| | | | |
|---|---|---|---|
| 11,159,991 B2* | 10/2021 | Lu | H04W 76/27 |
| 2019/0166644 A1* | 5/2019 | Shaw | H04W 76/16 |
| 2020/0120721 A1* | 4/2020 | Lau | H04W 76/11 |

* cited by examiner

*Primary Examiner* — Hermon Asres

(57) ABSTRACT

A method, a network device, and a non-transitory computer-readable storage medium are described in relation to an device detection and network slice assignment service. The device detection and network slice assignment service may include providing a subnetwork slice connection between a fixed wireless access device and a fifth generation (5G) radio access network device to an end device that is not 5G compatible. The fixed wireless access device may detect the end device based on an identifier included in a network assignment request. The fixed wireless access device may assign a network address, which may be associated with the network slice assignment service, to the end device. The fixed wireless access device may route traffic to and from the end device via the subnetwork slice connection.

20 Claims, 10 Drawing Sheets

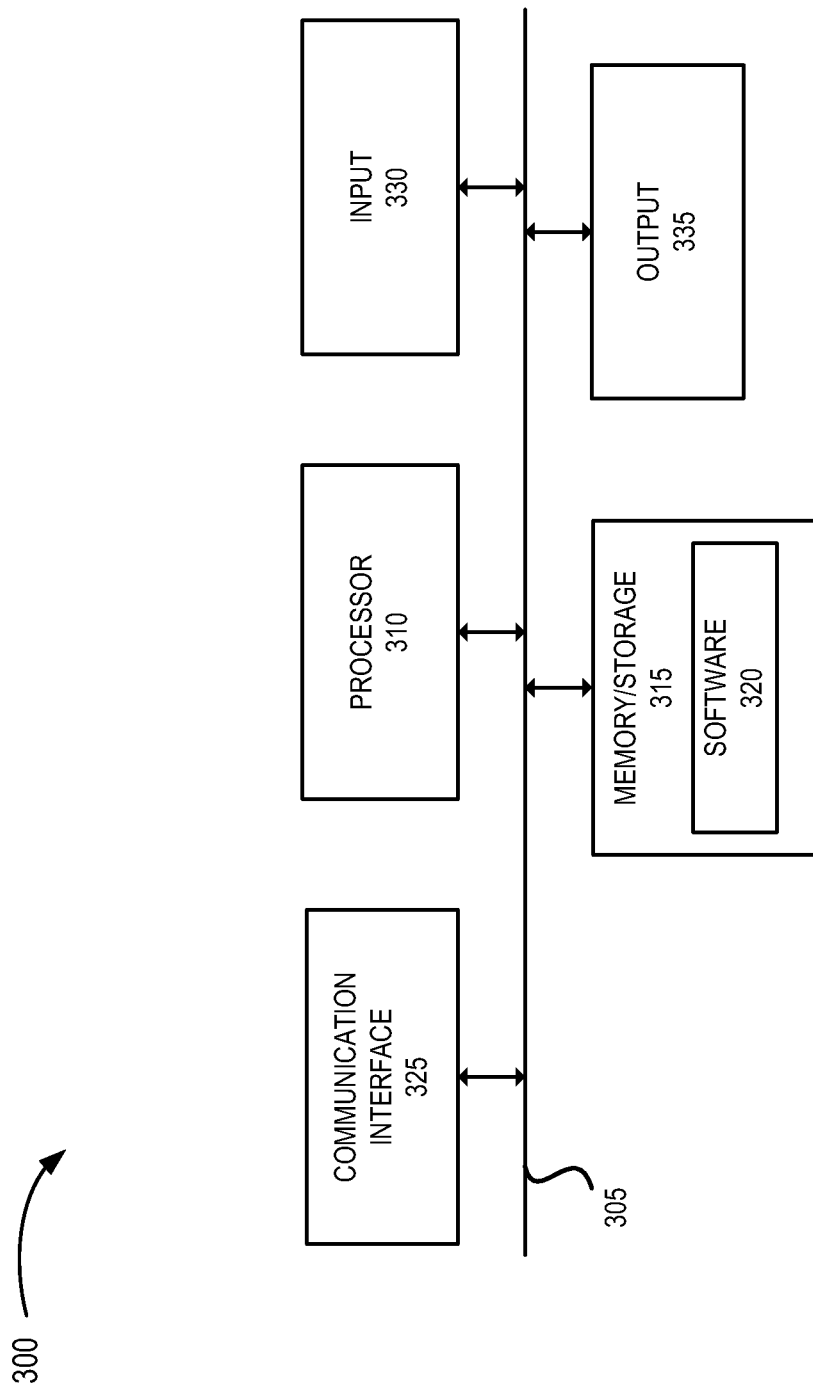

DEVICE DETECTION AND NETWORK SLICE ASSIGNMENT SERVICE

BACKGROUND

Development and design of networks present certain challenges from a network-side perspective and an end device perspective. For example, Next Generation (NG) wireless networks, such as Fifth Generation New Radio (5G NR) networks are being deployed and are under development.

BRIEF DESCRIPTION OF THE DRAWINGS

FIG. 3 is a diagram illustrating exemplary components of a device that may correspond to one or more of the devices illustrated and described herein;

DETAILED DESCRIPTION

Figure 1:
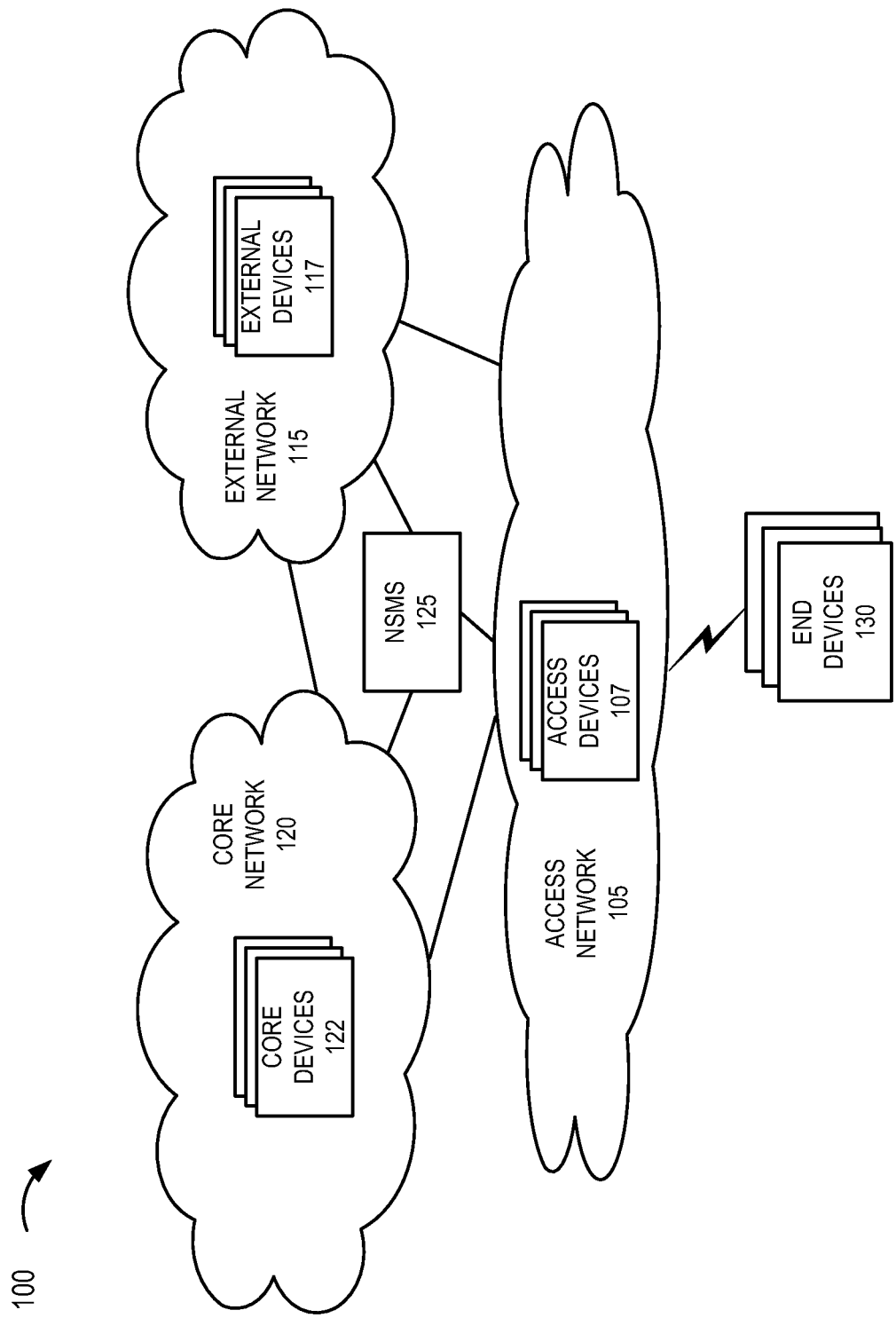
FIG. 1 is a diagram illustrating an exemplary environment in which an exemplary embodiment of a device detection and network slice assignment service may be implemented.

The following detailed description refers to the accompanying drawings. The same reference numbers in different drawings may identify the same or similar elements. Also, the following detailed description does not limit the invention.

Currently, a legacy device, such as a Fourth Generation (4G) end device, is unable to connect to a network slice, such as a Fifth Generation (5G) network slice, in a fixed wireless access (FWA) environment. For example, an FWA customer premises equipment (CPE) may not provide 5G slice service and appropriately route traffic to and from a network slice relative to the legacy end device (e.g., non-5G devices) absent additional hardware and/or software development or modification by a user of the legacy end device.

According to exemplary embodiments, a device detection and network slice assignment service is described. According to an exemplary embodiment, the device detection and network slice assignment service may detect a legacy device (e.g., not 5G compatible) subject to the network slice service based on a unique identifier (e.g., a media access control (MAC) address or another type of identifier), a vendor class, or the like associated with the legacy device, as described herein. According to an exemplary embodiment, the device detection and network slice assignment service may use a Dynamic Host Configuration Protocol (DHCP) procedure for detection of the legacy device subject to the device detection and network slice assignment service, as described herein.

According to an exemplary embodiment, based on the detection, the device detection and network slice assignment service may invoke an authorization procedure that may verify whether the legacy device is authorized to have the network slice connection, as described herein. According to an exemplary embodiment, based on a successful authorization procedure, the device detection and network slice assignment service may create or provision a network slice connection to an FWA device. According to an exemplary embodiment, the device detection and network slice assignment may assign or allocate a special network address (e.g., an Internet Protocol (IP) address associated with the device detection and network slice assignment service) to the legacy device. According to an exemplary embodiment, the device detection and network slice assignment service may allocate or assign a network address (e.g., an IP address not associated with the device detection and network slice assignment service) for a legacy device not subject to the service (e.g., a legacy device that does not satisfy the detection and authorization procedures). In this way, the device detection and network slice assignment service may automatically detect a legacy device, create an FWA device to network slice connection, and route traffic associated with the legacy device to and from the network slice via the FWA device.

In view of the foregoing, the device detection and network slice assignment service may provide a "plug and play" solution to legacy devices of an FWA environment that enables access and use of a network slice and associated quality of service (QOS) service without modification to the legacy devices (e.g., hardware, software, etc., upgrades and/or other types of modifications).

FIG. 1 is a diagram illustrating an exemplary environment 100 in which an exemplary embodiment of a device detection and network slice assignment service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes a network slice management system (NSMS) 125 and end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein. Although NSMS 125 is depicted outside of access network 105, external network 115, and core network 120, such depiction is purely exemplary. NSMS 125 may be deployed, in whole or in part, in any of these networks.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), virtual, logical, network slice, etc.). The number, the type, and the arrangement of network devices are exemplary.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the device detection and network slice assignment service may use at least one of these planes of communication. According to various exemplary implementations, the interface of the network device may be a service-based interface, a reference point-based interface, an Open Radio Access Network (O-RAN) interface, a 5G interface, another generation of interface (e.g., 5.5G, Sixth Generation (6G), Seventh Generation (7G), etc.), or some other type of network interface.

Access network 105 may include one or multiple networks of one or multiple types and technologies. For example, access network 105 may be implemented to include a 5G RAN, a future generation RAN (e.g., a 6G RAN, a 7G RAN, or a subsequent generation RAN), a centralized-RAN (C-RAN), an O-RAN, and/or another type of access network. Access network 105 may include a legacy RAN (e.g., a Third Generation (3G) RAN, a Fourth Generation (4G) or 4.5 RAN, etc.). Access network 105 may communicate with and/or include other types of access networks, such as, for example, a Wi-Fi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105.

Depending on the implementation, access network 105 may include one or multiple types of network devices, such as access devices 107. For example, access device 107 may include a gNB, an evolved Long Term Evolution (eLTE) evolved Node B (eNB), an eNB, a radio network controller (RNC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, a home gNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, an FWA CPE, a wireless home router, a wireless modem, etc.) that provides a wireless access service, or another type of network device that provides a transport service (e.g., routing and forwarding), such as a router, a switch, or another type of layer 2 or layer 3 (e.g., network layer of the Open Systems Interconnection (OSI) model) network device.

According to an exemplary embodiment, at least some of access devices 107 include logic of the device detection and network slice assignment service, as described herein. For example, access device 107 may perform a device detection procedure, an authorization procedure, a network slice connection procedure, a network address assignment procedure, and a routing procedure associated with the device detection and network slice assignment service, as described herein. Access device 107 may transmit and receive messages pertaining to the device detection and network slice assignment service, as described herein. According to an exemplary embodiment, access device 107 may be implemented as an FWA device, such as an FWA CPE. The FWA device may be a wireless device or a wired device. For example, the FWA device may include a router, a modem, and/or a CPE (e.g., for a home, an enterprise site, or the like) that may provide access to an Internet service. According to an exemplary embodiment, a northbound interface of the FWA device may include a 5G (or future generation) interface that enables connection with other access devices 107 (e.g., a gNB, etc.). According to an exemplary embodiment, a south bound interface of the FWA device, which may be used to connect to end devices 130, may include a Wi-Fi interface, an Ethernet interface, a WiMAX interface, and/or another type of wired or wireless connection that may support the DHCP. According to an exemplary embodiment, the FWA device may include a DHCP server. For purposes of description, the FWA device may not include a base station (e.g., a gNB, an eNB, a home eNB, another type of cellular device, or the like) or a small cell (e.g., a femtocell, etc.).

External network 115 may include one or multiple networks of one or multiple types and technologies that provides an application service. For example, external network 115 may be implemented using one or multiple technologies including, for example, network function virtualization (NFV), software defined networking (SDN), cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS) network, a Rich Communication Service (RCS) network, a software-defined (SD) network, a virtual network, a packet-switched network, a data center, a data network, or other type of network that may provide access to and may host an end device application service.

Depending on the implementation, external network 115 may include various network devices such as external devices 117. For example, external devices 117 may include virtual network devices (e.g., virtualized network functions (VNFs), servers, host devices, application functions (AFs), application servers (ASs), server capability servers (SCSs), containers, hypervisors, virtual machines (VMs), network function virtualization infrastructure (NFVI), and/or other types of virtualization elements, layers, hardware resources, operating systems, engines, etc.) that may be associated with application services for use by end devices (not illustrated). By way of further example, external devices 117 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). Although not illustrated, external network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), Internet of Things (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, conferencing, instant messaging), video streaming, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and/or external devices 117 that may pertain to various network-related functions (e.g., security, management, charging, billing, authentication, authorization, policy enforcement, development, etc.). External devices 117 may include non-virtual, logical, and/or physical network devices.

Core network 120 may include one or multiple networks of one or multiple network types and technologies. Core network 120 may include a complementary network of access network 105. For example, core network 120 may be implemented to include a 5G core network, an evolved packet core (EPC) of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF) (which may include a NW-TT), a Non-3GPP Interworking Function (N3IWF), an access and mobility management function (AMF), a session management function (SMF), a unified data management (UDM) device, a unified data repository (UDR), an authentication server function (AUSF), a network slice selection function (NSSF), a network repository function (NRF), a policy control function (PCF), a network data analytics function (NWDAF), a network exposure function (NEF), a service capability exposure function (SCEF), a lifecycle management (LCM) device, a TSCTSF, a mobility management entity (MME), a packet data network gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

According to an exemplary embodiment, at least some of core devices 122 may include logic of the device detection and network slice assignment service, as described herein. For example, core devices 122 may provide an authorization procedure associated with the device detection and network slice assignment service, as described herein. For example, the authorization procedure may be implemented by a UDM/UDR, an authorization device, or similar functioning core device 122 that may determine whether end device 130 is authorized to have a network slice connection to the FWA device. Core devices 122 may transmit and receive messages pertaining to the device detection and network slice assignment service, as described herein. Core devices 122 may include other types of devices in support of the authorization procedure, such as an AMF or the like. Core devices 122 may also include logic that supports the network slice connection procedure of the device detection and network slice assignment service.

NSMS 125 may include a network device that provides a network slice management service. For example, NSMS 125 may provision and manage network slices, which may be supported by the various networks of environment 100, that provide various application/vertical services to end devices 130. For example, NSMS 125 may provision and manage (e.g., setup, maintenance, teardown) network slices that may support a diverse array of application services and associated performance metric, service level agreement (SLA), and quality of service (QOS) requirements.

According to an exemplary embodiment, NSMS 125 may provision a subnetwork slice between an FWA device (e.g., FWA CPE) and a wireless station (e.g., a gNB or the like), as described herein. According to an exemplary embodiment, NSMS 125 may provision and manage other subnetwork slices, such as RAN network slices, core network slices, application layer network slices (e.g., MEC slices, etc.), and end-to-end network slices (e.g., end device 130 to an application service device, a PDN server, etc.).

End device 130 includes a device that may have communication capabilities (e.g., wireless, wired, optical, etc.). End device 130 may or may not have computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a wearable device (e.g., a watch, glasses, etc.), a computer, a gaming device, a music device, an IoT device, a drone, a smart device, a fixed wireless device, a router, a sensor, an automated guided vehicle (AGV), an industrial robot, or other type of wireless device (e.g., other type of UE). End device 130 may be configured to execute various types of software (e.g., applications, programs, etc.). The number and the types of software may vary among end devices 130. End device 130 may include "edge-aware" and/or "edge-unaware" application service clients. For purposes of description, end device 130 is not considered a network device.

According to an exemplary embodiment, the device detection and network slice assignment service pertains to end device 130 that does not have 5G wireless capability. As described in relation to the FWA device, end device 130 may connect to the FWA device via a Wi-Fi interface, an Ethernet interface, a WiMAX interface, and/or another type of wired or wireless connection that may support the DHCP, for example.

FIGS. 2A-2E are diagrams illustrating an exemplary process 200 of an exemplary embodiment of the device detection and network slice assignment service according to an exemplary scenario. As illustrated, process 200 may be implemented in an environment that includes end device 130, such as IoT device 205, access devices 107, such as an FWA device 210 and a gNB 215, external devices 117, core devices 122, and NSMS 125. As described in relation to FIG. 1, according to other exemplary embodiments, the environment may include other types of core devices 122 and access device(s) 107, not specifically illustrated and described in FIGS. 2A-2E.

FWA device 210 may include logic of an exemplary embodiment of the device detection and network slice assignment service. For example, FWA device 210 may perform a device detection procedure, a network address assignment procedure, and a routing procedure associated with the device detection and network slice assignment service, as described herein. FWA device 210 may further transmit and receive messages relating to an authorization procedure and establish a network slice connection with gNB 215 based on a network slice connection procedure and NSMS 125.

gNB 215 may provide a function and/or a service in accordance with a network standard (e.g., 3GPP, 3GPP2, ITU, ETSI, GSMA, and/or the like) and/or of a proprietary nature. For example, gNB 215 may provide packet processing, baseband processing, radio signal processing, radio resource control, mobility control, session management, and allows end device 130 to connect to core network 120 via an air interface, among other functions. Additionally, for example, gNB 215 may include logic of an exemplary embodiment of the device detection and network slice assignment service. For example, gNB 215 may receive and transmit messages that support the device detection and network slice assignment service including establishing a network slice connection with FWA device 210.

The messages illustrated and described are exemplary. According to an exemplary embodiment, the messages may be implemented to include DHCP messages, Radio Resource Control (RRC) messages, and other protocol messages associated with a 5G system. According to other exemplary embodiments, the messages may be implemented using a protocol different from that described and/or include additional, different, and/or fewer instances of data or information. Additionally, process 200 may include additional messages and/or communications between core devices 122, access device 107, end device 130, and/or another network device not specifically described and illustrated.

Figure 2A:
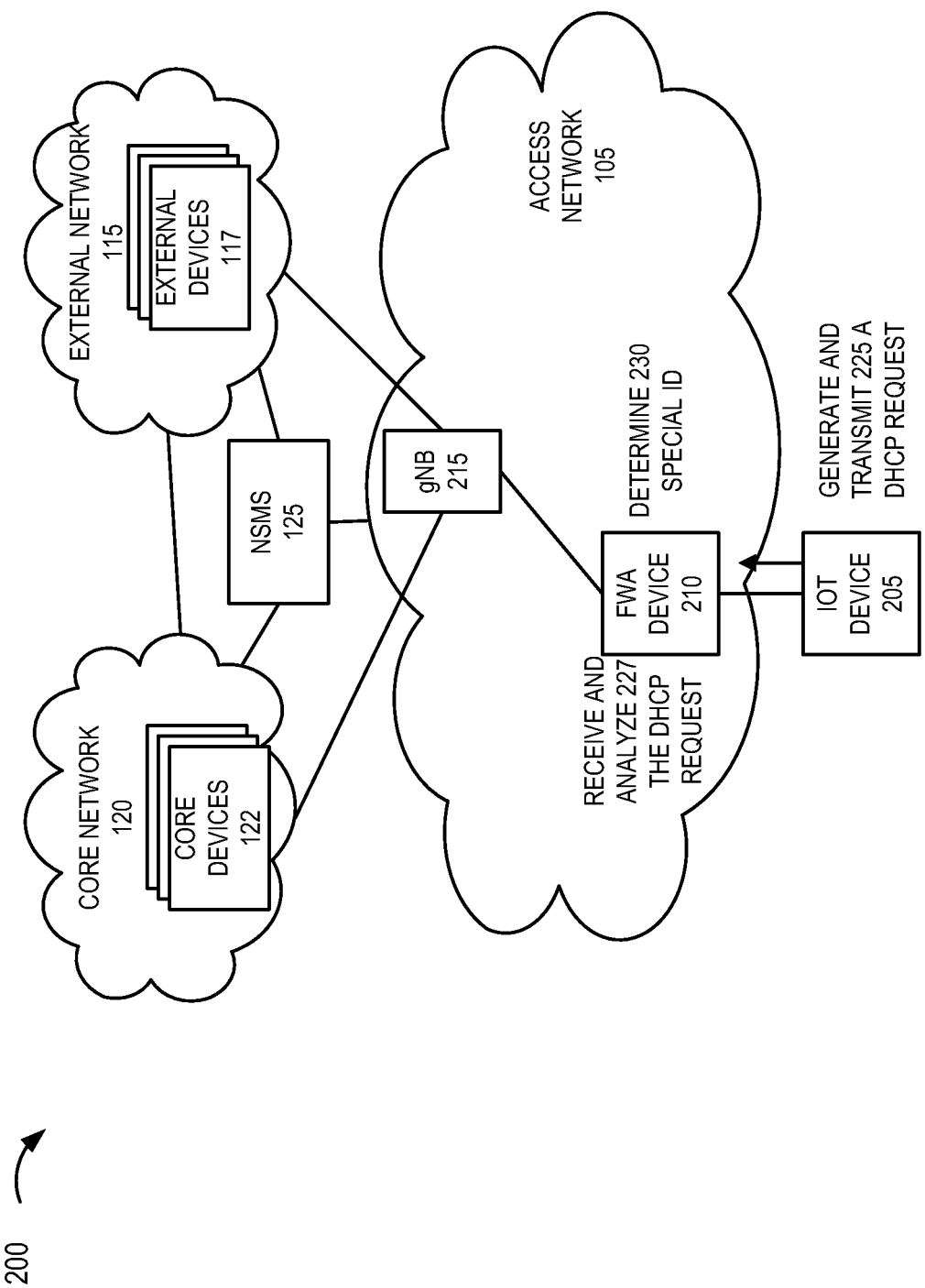
FIGS. 2A-2E are diagrams illustrating an exemplary process of an exemplary embodiment of the device detection and network slice assignment service.

Referring to FIG. 2A, according to an exemplary scenario, IoT device 205 may generate and transmit 225 a DHCP request to FWA device 210. According to various exemplary implementations, the DHCP request may be a DHCP DISCOVER message or a DHCP REQUEST message. According to various exemplary scenarios, the connection between IoT device 205 may be a wireless connection (e.g., Wi-Fi connection, etc.), a wired connection (e.g., an Ethernet connection), via an intermediary device (e.g., a virtual local area network (VLAN) switch), or another suitable non-5G connection. According to an exemplary implementation, the DHCP request may include a MAC address of IoT device 205. Additionally, or alternatively, the DHCP request may include an identifier of IoT device 205. For example, the identifier may be a vendor class, a Mobile Station International Subscriber Directory Number (MSISDN), an International Mobile Subscriber Identity (IMSI), a UE identifier, a Mobile Directory Number (MDN), an International Mobile Equipment Identity (IMEI), a Mobile Equipment Identifier (MEID), a permanent equipment identifier (PEI), a globally unique identifier (GUI), a temporary identifier, or another suitable user and/or end device identifier.

As further illustrated, FWA device 210 may receive and analyze 227 the DHCP request. For example, FWA device 210 may perform a lookup in data structure or database that may store DHCP entries. As a part of the analysis and lookup, FWA device 220 may determine whether a portion of the MAC address (e.g., a MAC address prefix), a vendor class, or another identifier of IoT device 205, matches an existing DHCP entry. If there is a match, although not illustrated, FWA device 210 may allocate an IP address from the matching DHCP entry to IoT device 205. If there is not a match, although not illustrated, FWA device 210 may determine whether the portion of the MAC address, the vendor class or another identifier matches data indicating that IoT device 205 may be subject to the device detection and network slice assignment service. If there is not a match with the data, then FWA device 210 may allocate an IP address from a (normal) pool of IP addresses and associated vLAN. If there is a match with the data, as illustrated, FWA device 210 may determine 230 that the DHCP request from IoT device 205 includes a special identifier that indicates particular treatment. According to some exemplary embodiments, FWA device 210 may perform the device detection procedure based on a configured policy. For example, a DHCP policy may indicate to detect certain end devices 130 that may be associated with a special identifier (e.g., MAC prefix, vendor class, or another type of identifier (in whole or in part)).

Figure 2B:
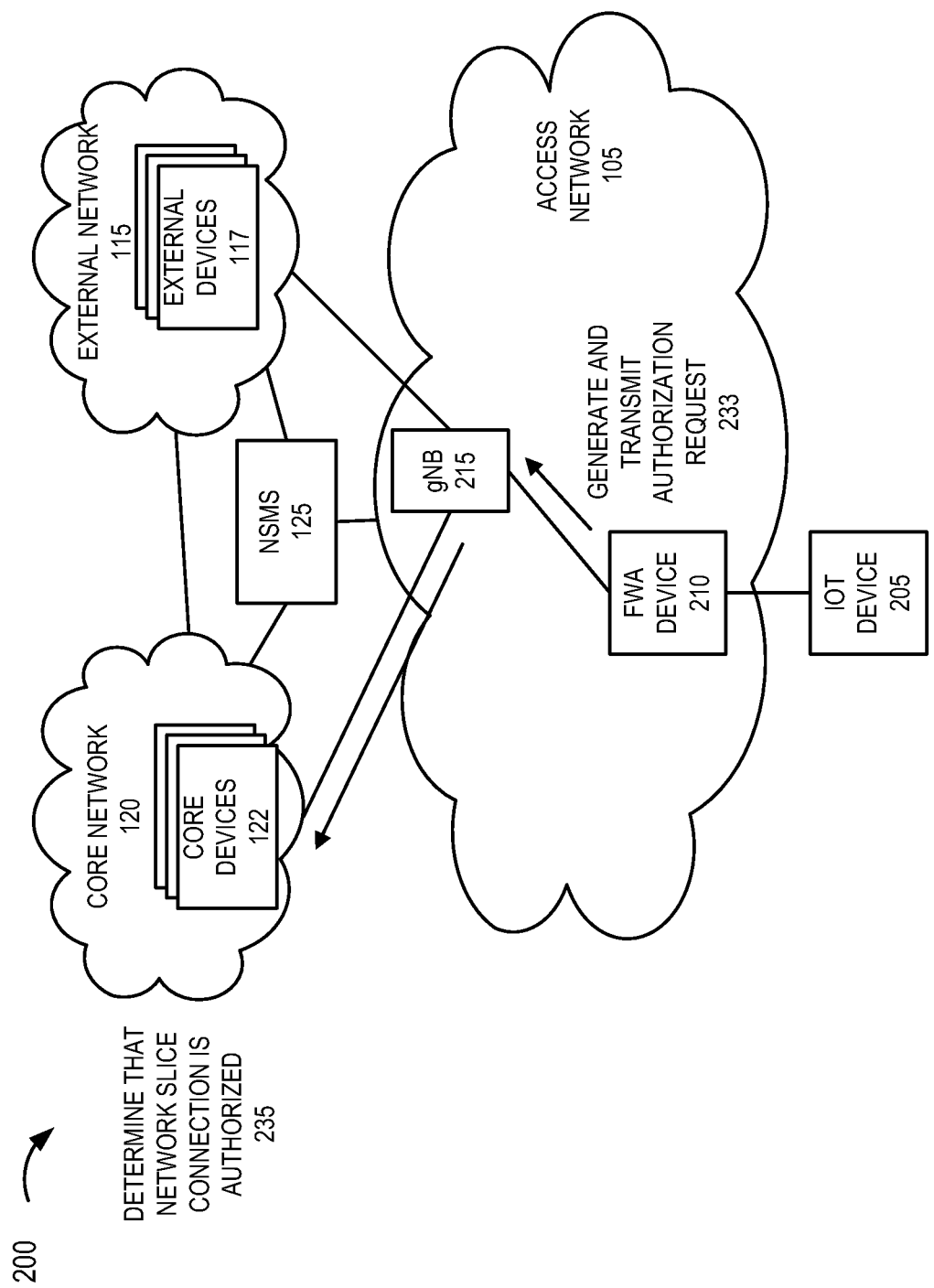

Referring to FIG. 2B, according to this exemplary scenario in which there is a match with the data, FWA device 210 may generate and transmit an authorization request 233 to an authorization device via gNB 215. The authorization request may include information included in the DHCP request (e.g., MAC address, identifier, etc.). According to this exemplary scenario, core device 122 may perform an authorization procedure in response to receiving the authorization request. For example, a UDM/UDR device or another core device 122 that may determine whether IoT device 205 and/or associated user/subscriber may be authorized to a network slice connection, as described herein. For example, the authorization procedure may include performing a lookup based on the special identifier to determine whether the network slice is authorized or not. According to this exemplary scenario, assume that core device 122 determines that a network slice connection is authorized 235. Although not illustrated, in the event that authorization is unsuccessful, an authorization response, which may indicate a negative authorization, may be generated and transmitted to FWA device 210. In response, FWA device 210 may allocate an IP address from a (normal) pool of IP addresses and associated vLAN. Alternatively, according to some exemplary embodiments, although not illustrated, core device 122 may transmit an authorization response to FWA device 210 indicating a successful authorization. FWA device 210 may wait for subnetwork slice provisioning, as described herein.

Figure 2C:
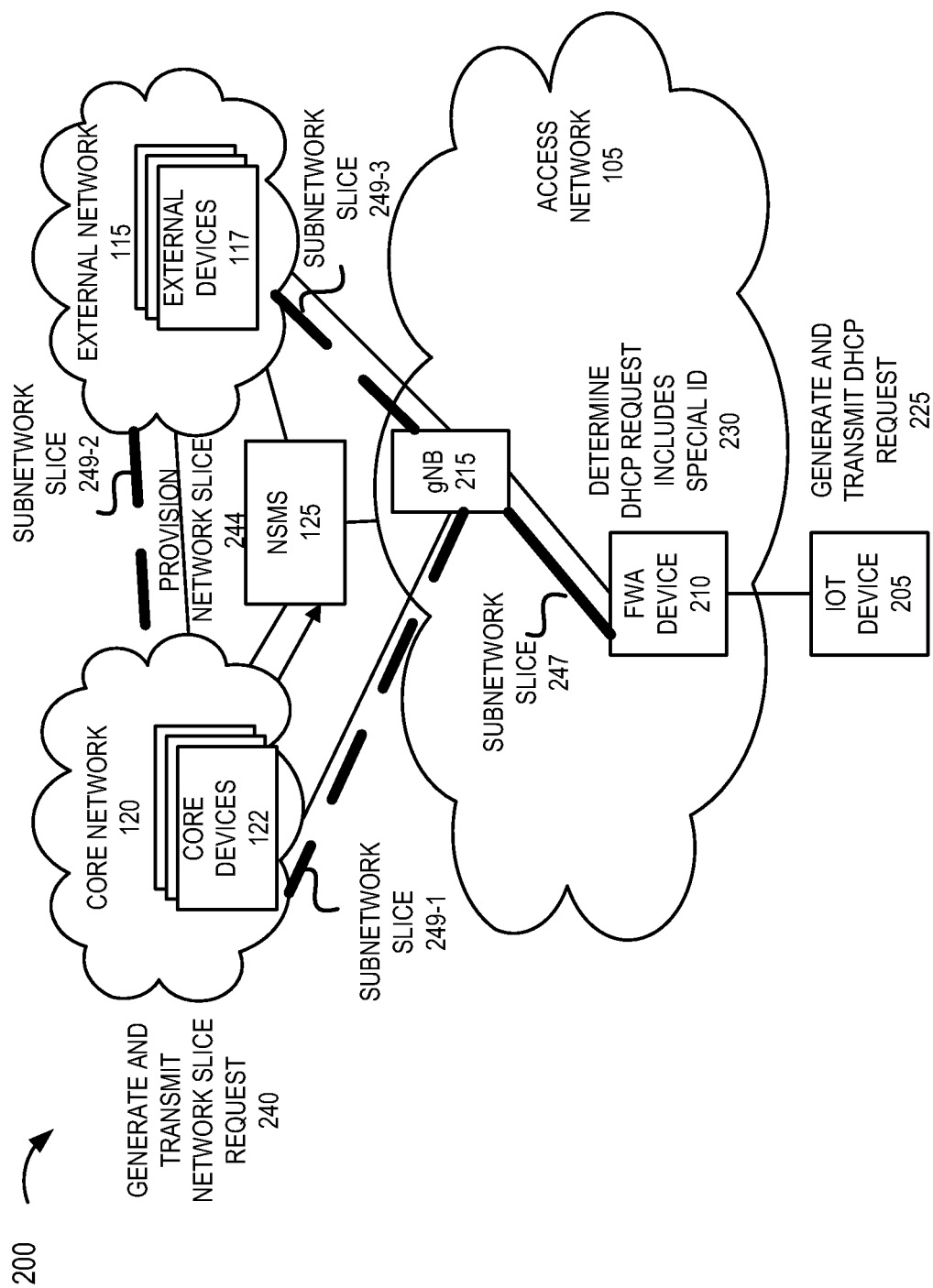

Referring to FIG. 2C, in response to determining a successful authorization, core device 122 may generate and transmit a network slice request 240 to NSMS 125. In response to receiving and analyzing the request, NSMS 125 may provision a network slice 244. According to an exemplary embodiment, NSMS 125 may provision a subnetwork slice 247 connection between FWA device 210 and gNB 215, as illustrated. According to various exemplary embodiments, NSMS 125 may provision other subnetwork slices, which may provide a network slice connection between gNB 215 and core network 120, between core network 120 and external network 115, and/or between gNB 215 and external network 115 in correspondence to subnetwork slices 249-1 through 249-3. As an example, subnetwork slice 249-3 may support a PDU session with a MEC server. According to another example, subnetwork slices 249-1 and 249-2 may support a PDU session with a PDN. According to yet another example, subnetwork slice 249-1 may support a PDU session with a UPF in core network 120.

Figure 2D:
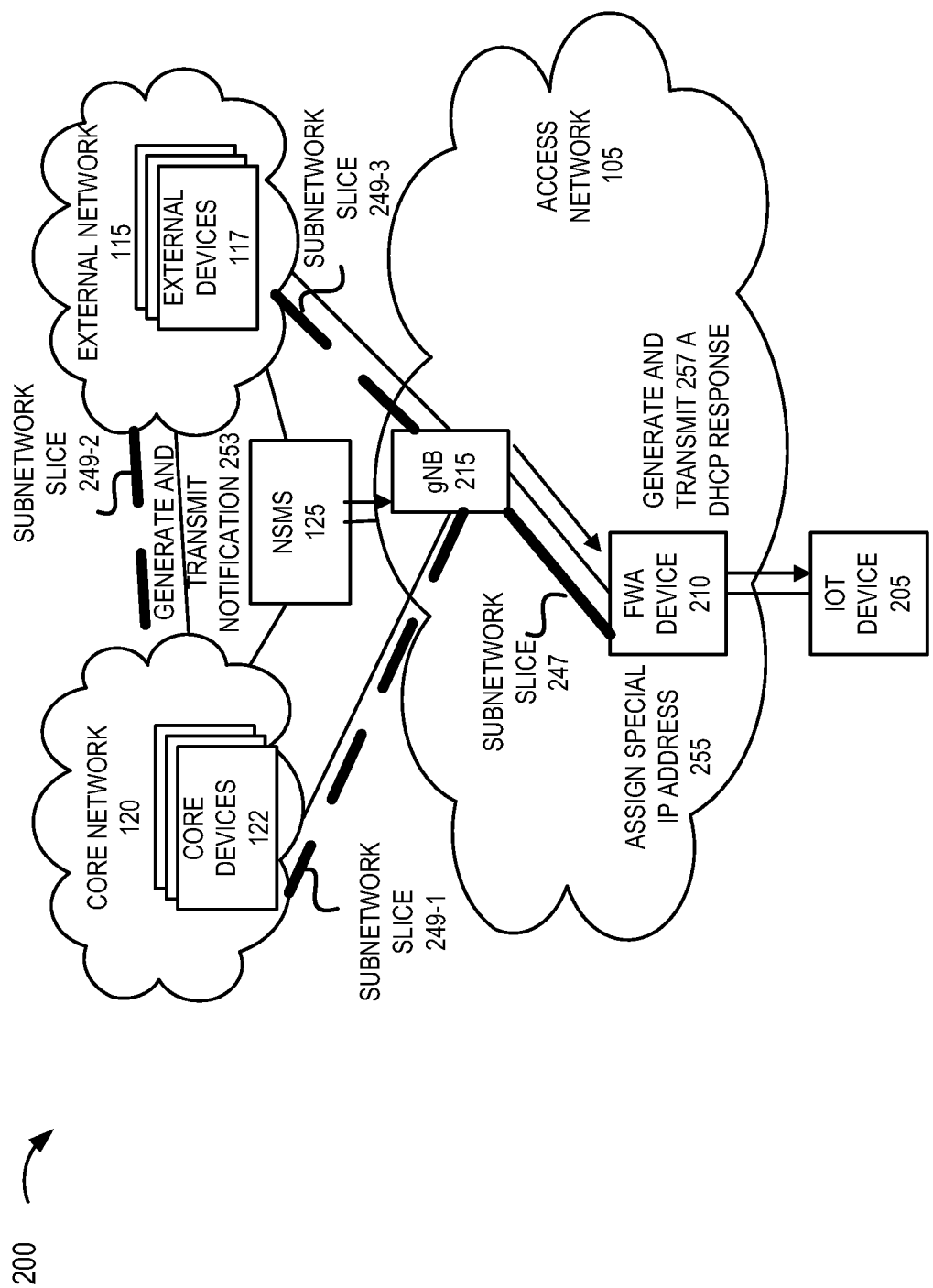

Referring to FIG. 2D, in response to the provisioning of the subnetwork slice between FWA device 210 and gNB 215 and optionally any other upstream subnetwork slice, NSMS 125 may generate and transmit a notification 253 to FWA device 210 via gNB 215. The notification may indicate the successful authorization and/or the provisioning of the subnetwork slice between gNB 215 and FWA device 210. In response to receiving the notification, FWA device 210 may assign a special IP address 255 for IOT device 205. For example, FWA device 210 may assign the special IP address from a special IP address pool pertaining to the network slice service. Additionally, FWA device 210 may route traffic to a different vLAN (e.g., relative to a normal vLAN) in order to distinguish traffic to and from IoT device 205 via the network slice (relative to other end devices 130 and non-network slice connections). According to an exemplary embodiment, the special IP address may include a specific lease duration. According to an exemplary embodiment, FWA device 210 may delete or disconnect from the network slice connection when no end devices 130 (e.g., special end devices 130) are connected to it and/or there are no active special IP addresses. As further illustrated, FWA device 210 may generate and transmit 257 a DHCP response to IoT device 205. The DHCP response may include the special IP address. For example, the DHCP response may be a DHCP OFFER message or a DHCP ACK message. According to an exemplary implementation, the special IP address pool may include IP addresses within a certain range of values.

Figure 2E:
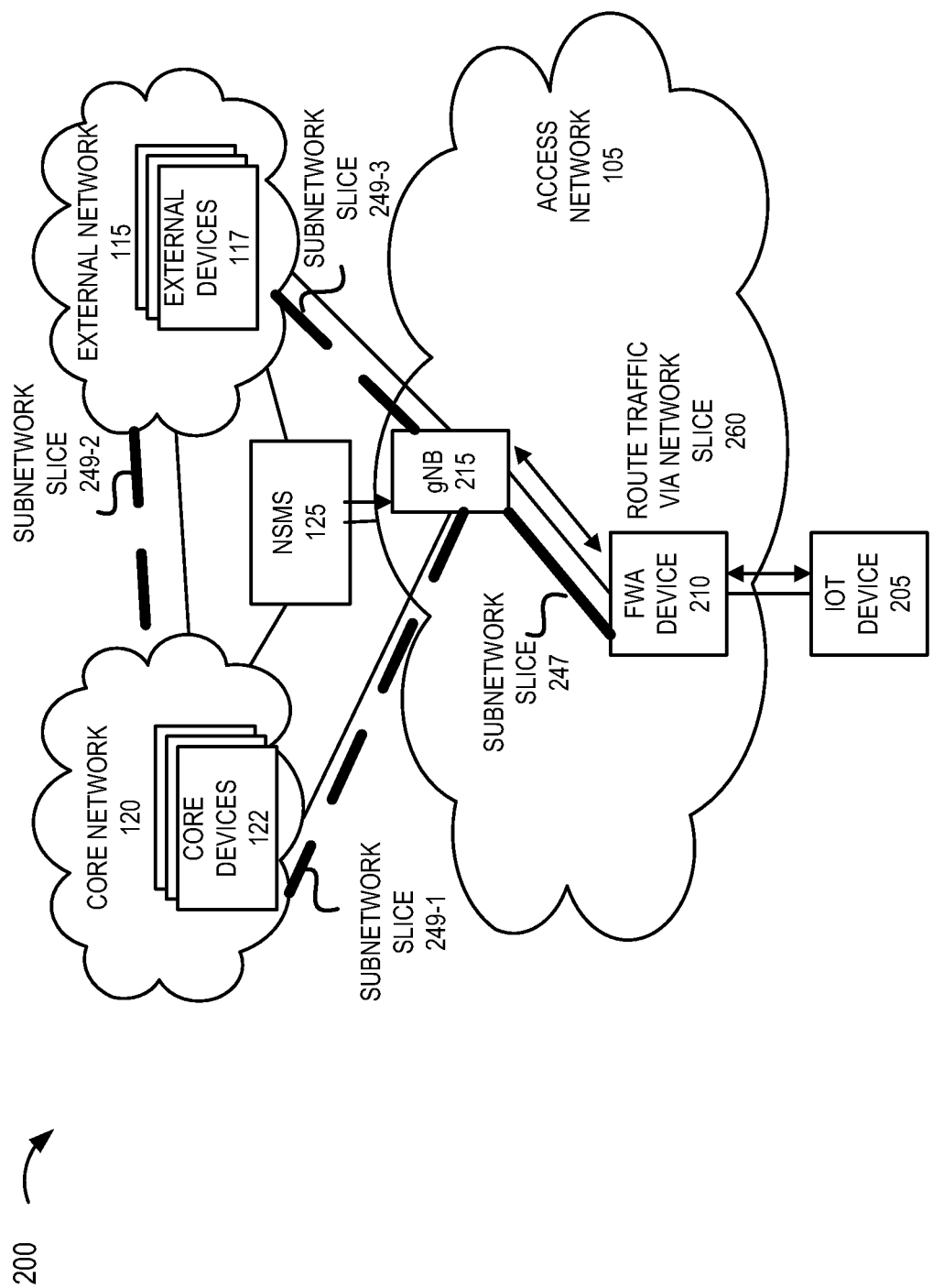

Referring to FIG. 2E, based on a session, FWA device 210 may route traffic via the network slice 260 and use a different vLAN relative to other end devices 130 which may not be afforded the network slice service, as described herein.

According to other exemplary embodiments and scenarios, process 200 may include additional operations, fewer operations, and/or different operations that may be performed. For example, one or more operations of process 200 may be performed after the PDU session is established.

FIG. 3 is a diagram illustrating exemplary components of a device 300 that may be included in one or more of the devices described herein. For example, device 300 may correspond to access device 107, external device 117, core device 122, NSMS 125, end device 130, IoT device 205, gNB 215 and/or other types of devices, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, learning, model-based, etc.

Memory/storage 315 includes one or multiple memories and/or one or multiple other types of storage mediums. For example, memory/storage 315 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 315 may be external to and/or removable from device 300, such as, for example, a Universal Serial Bus (USB) memory stick, a dongle, a hard disk, mass storage, off-line storage, or some other type of storing medium. Memory/storage 315 may store data, software, and/or instructions related to the operation of device 300.

Software 320 includes an application or a program that provides a function and/or a process. As an example, with reference to FWA device 210, software 320 may include an application that, when executed by processor 310, provides a function and/or a process of device detection and network slice assignment service, as described herein. Additionally, for example, with reference to NSMS 125 and gNB 215, software 320 may include an application that, when executed by processor 310, provides a function and/or a process of device detection and network slice assignment service, as described herein. Software 320 may also include firmware, middleware, microcode, hardware description language (HDL), and/or another form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces, optical interfaces, and/or wired interfaces. For example, communication interface 325 may include one or multiple transmitters and receivers, or transceivers. Communication interface 325 may operate according to a protocol stack and a communication standard.

Input 330 permits an input into device 300. For example, input 330 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 300 may be implemented in the same manner. For example, device 300 may be instantiated, created, deleted, or some other operational state during its life-cycle (e.g., refreshed, paused, suspended, rebooting, or another type of state or status), using well-known virtualization technologies. For example, access device 107, core device 122, external device 117, and/or another type of network device or end device 130, as described herein, may be a virtualized device.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a function or a process described herein. Alternatively, for example, according to other implementations, device 300 performs a function or a process described herein based on the execution of hardware (processor 310, etc.).

Figure 4A:
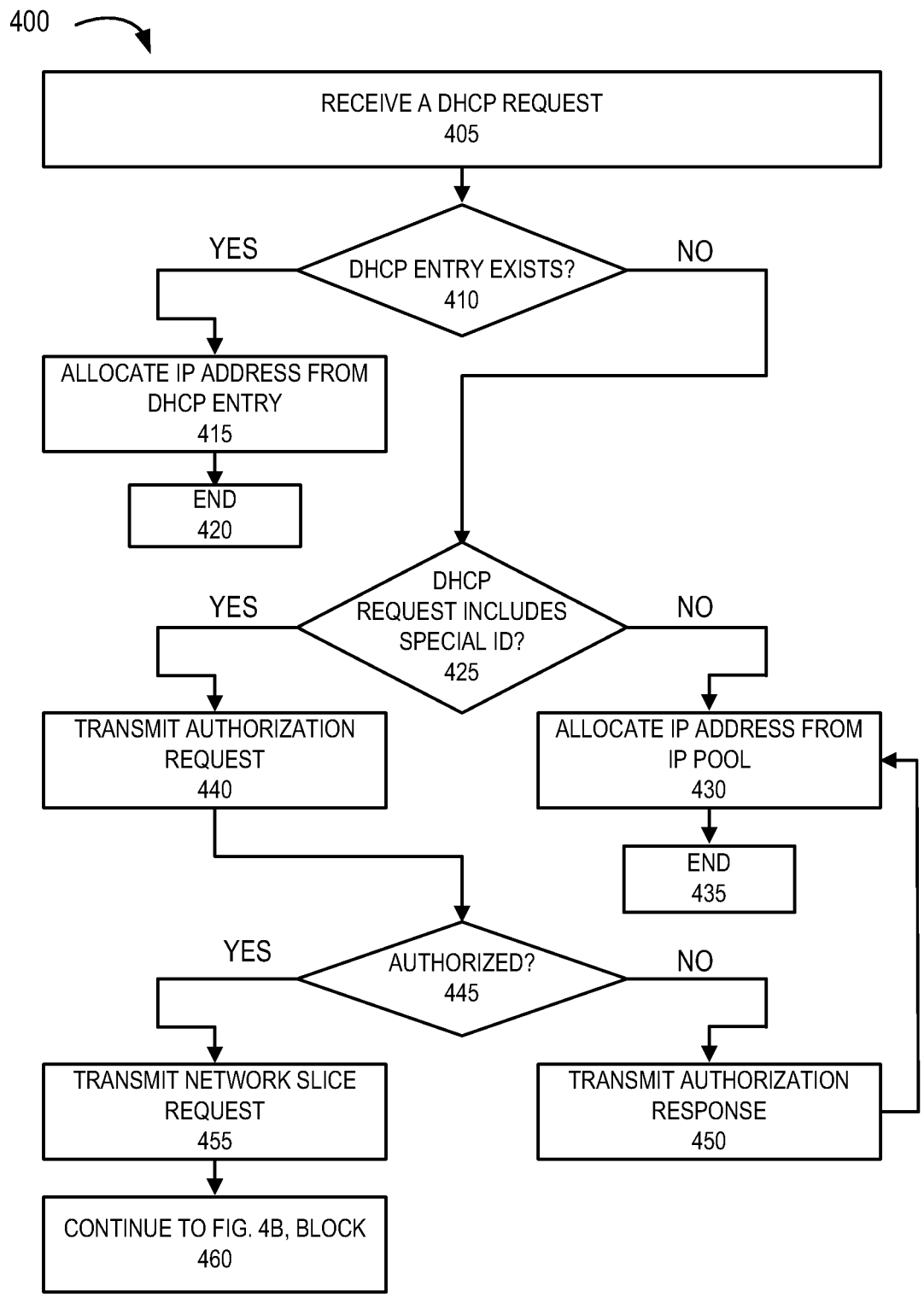
FIGS. 4A and 4B are flow diagrams illustrating an exemplary process of an exemplary embodiment of the device detection and network slice assignment service.
Figure 4B:
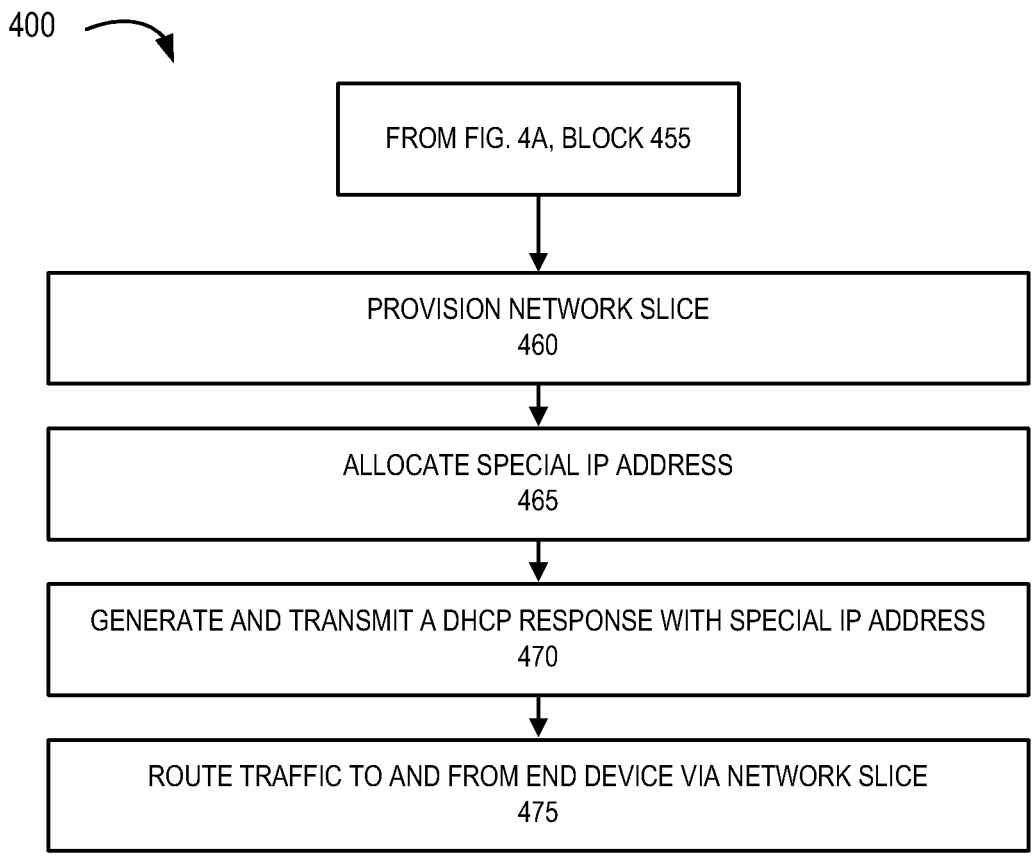

FIGS. 4A and 4B are flow diagrams illustrating an exemplary process 400 of an exemplary embodiment of the device detection and network slice assignment service. According to an exemplary embodiment, FWA device 210, such as an FWA CPE may perform a step of process 400. According to an exemplary embodiment, core device 122 and NSMS 125 may each perform a step of process 400.

According to an exemplary implementation, processor 310 executes software 320 to perform a step of process 400, as described herein. Alternatively, a step may be performed by execution of only hardware.

In block 405, FWA device 210 may receive a DHCP request. For example, the DHCP request may be implemented as a DHCP DISCOVER message or a DHCP REQUEST message. FWA device 210 may receive the DHCP request from end device 130. In block 410, FWA device 210 may determine whether there is a DHCP entry for end device 130. For example, FWA device 210 may perform a lookup to determine if there is a DHCP entry that matches or pertains to end device 130. When there is a match (block 410—YES), FWA device 210 may assign or allocate the IP address (e.g., included in the DHCP entry) 415 to end device 130. Process 400 may end (block 420). For example, FWA device 210 may transmit a DHCP response that includes the allocated IP address.

When there is not a match (block 410-NO), FWA device 210 may determine whether the DHCP request includes a special identifier (block 425). For example, FWA device 210 may compare a MAC prefix, a vendor class, or another identifier to data that may pertain or indicate the device detection and network slice assignment service, as described herein. When there is not a match (block 425-NO), FWA device may allocate an IP address from a (normal) IP pool and use a (normal) vLAN (block 430). Process 400 may end (block 435). For example, FWA device 210 may transmit a DHCP response that includes the allocated IP address.

When there is a match (block 425—YES), FWA device 210 may transmit an authorization request (block 440). For example, FWA device 210 may transmit the authorization request to core device 122. In response to receiving the authorization request, in block 445, core device 122 may determine whether end device 130 and/or a user/subscriber associated with end device 130 is authorized for the network slice, as described herein. For example, core device 122 may perform a lookup in subscription information pertaining to end device 130 and/or the user/subscriber. Based on a result of the lookup, when core device 122 determines that the device is not authorized (block 445-NO), core device 122 may transmit an authorization response (block 450) to FWA device 210. The authorization response may indicate that end device 130 and/or the user/subscriber is unauthorized. Process 400 may return to block 430, which was previously described.

When core device 122 determines that there is authorization (block 445—YES), core device 122 may transmit a network slice request (block 455). For example, core device 122 may transmit the network slice request to NSMS 125. Referring to FIG. 4B, in response to receiving the network slice request, NSMS 125 may provision the network slice (block 460). For example, NSMS 125 may provision a subnetwork slice between FWA device 210 and another access device 107 (e.g., gNB 215). NSMS 125 may provision other subnetwork slices, as described herein. NSMS 125 may transmit a notification message to FWA device 210, as described herein.

In block 465, FWA device 210 may allocate a special IP address. For example, in response to receiving the notification, FWA device 210 may select and assign the special IP address to end device 130, as described herein.

In block 470, FWA device 210 may generate and transmit a DHCP response with the special IP address.

In block 475, FWA device 210 may route traffic to and from end device 130 via the network slice. FWA device 210 may further route traffic via a vLAN pertaining to the network slice connection.

FIGS. 4A and 4B illustrate an exemplary process of the device detection and network slice assignment service, however, according to other exemplary embodiments, the device detection and network slice assignment service may perform additional operations, fewer operations, and/or different operations than those illustrated and described.

Figure 5:
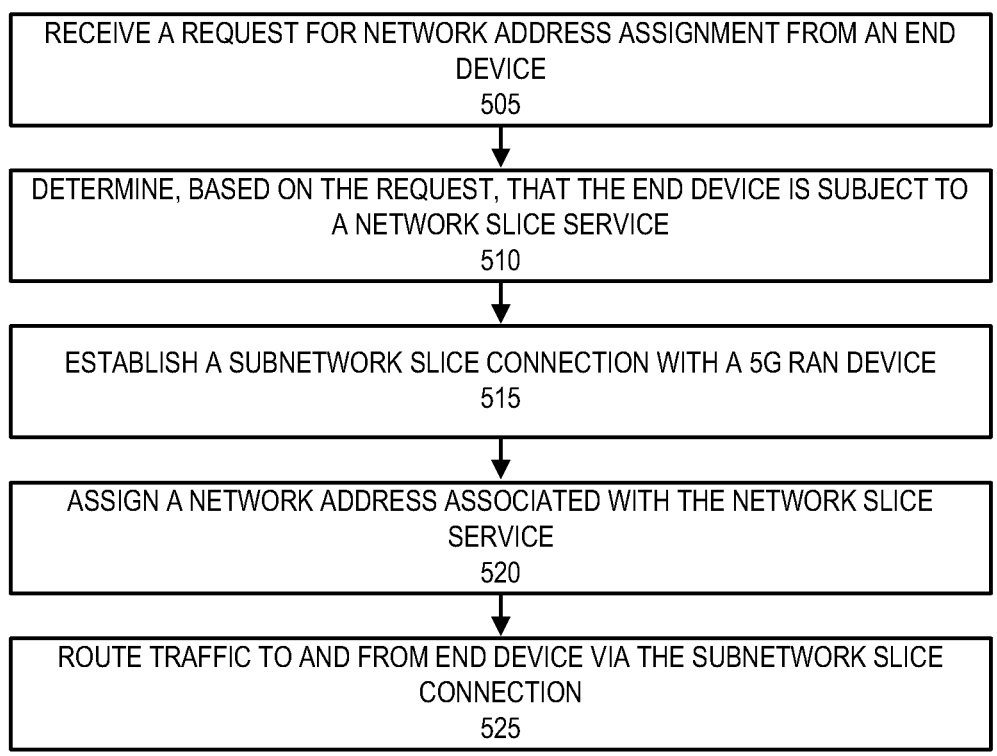
FIG. 5 is a flow diagram illustrating another exemplary process of an exemplary embodiment of the device detection and network slice assignment service.

FIG. 5 is a flow diagram illustrating another exemplary process 500 of an exemplary embodiment of the device detection and network slice assignment service. According to an exemplary embodiment, FWA device 210, such as an FWA CPE may perform a step of process 500. According to an exemplary implementation, processor 310 executes software 320 to perform a step of process 400, as described herein. Alternatively, a step may be performed by execution of only hardware.

In block 505, FWA device 210 may receive a request for an assignment of a network address from end device 130. For example, the request may be implemented as a DHCP DISCOVER message or a DHCP REQUEST message. Alternatively, the request may be implemented as a non-DHCP message.

In block 510, FWA device 210 may determine, based on the request, that end device 130 is subject to a network slice service. For example, FWA device 210 may analyze an identifier included in the request, as described herein.

In block 515, FWA device 210 may establish a subnetwork slice connection with another access device 107. For example, based on the provisionment of NSMS 125, FWA device 210 may establish a subnetwork slice connection with a gNB or another access device 107 that has 5G capabilities (e.g., eLTE eNB, etc.) or future generation wireless station.

In block 520, FWA device 210 may assign a network address associated with the network slice service. For example, FWA device 210 may allocate a special IP address to end device 130, as described herein.

In block 525, FWA device 210 may route traffic to and from end device 130 via the subnetwork slice connection, as described herein.

FIG. 5 illustrates an exemplary process of the device detection and network slice assignment service, however, according to other exemplary embodiments, the device detection and network slice assignment service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the process illustrated in FIGS. 4A and 4B, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to the consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
receiving, by a fixed wireless access device that is not a base station, from an end device, a request for a network address assignment, wherein the end device is not a fifth generation (5G) compatible device;
determining, by the fixed wireless access device based on the request, that the end device is subject to a network slice service that includes a network slice connection between the fixed wireless access device and a 5G radio access network (RAN) device;
establishing, by the fixed wireless access device, a subnetwork slice connection with the 5G RAN device; and
assigning, by the fixed wireless access device to the end device, a network address allocated for the network slice service.

2. The method of claim 1, further comprising:
comparing, by the fixed wireless access device, an identifier included in the request to one or more identifiers indicative of the network slice service; and
determining, by the fixed wireless access device, a match between the identifier and one of the one or more identifiers.

3. The method of claim 1, further comprising:
transmitting, by the fixed wireless access device, an authorization request, which pertains to the end device and the network slice service, to a core device.

4. The method of claim 1, further comprising:
routing, by the fixed wireless access device, traffic to and from the end device via the subnetwork slice connection.

5. The method of claim 1, wherein the request is a Dynamic Host Configuration Protocol request.

6. The method of claim 1, further comprising:
receiving, by the fixed wireless access device from a network device after the determining, a message indicating that the end device is authorized to use the network slice service.

7. The method of claim 1, further comprising:
transmitting, by the fixed wireless access device to the end device, a response that includes the network address allocated for the network slice service.

8. The method of claim 1, wherein the fixed wireless access device is customer premises equipment that includes at least one of a wireless router or a wireless modem.

9. A network device comprising:
a processor that is configured to:
receive from an end device, a request for a network address assignment, wherein the end device is not a fifth generation (5G) compatible device and the network device is a fixed wireless access device that is not a base station;
determine, based on the request, that the end device is subject to a network slice service that includes a network slice connection between the fixed wireless access device and a 5G radio access network (RAN) device;
establish a subnetwork slice connection with the 5G RAN device; and
assign to the end device, a network address allocated for the network slice service.

10. The network device of claim 9, wherein the processor is further configured to:
compare an identifier included in the request to one or more identifiers indicative of the network slice service; and
determine a match between the identifier and one of the one or more identifiers.

11. The network device of claim 9, wherein the processor is further configured to:
transmit an authorization request, which pertains to the end device and the network slice service, to a core device.

12. The network device of claim 9, wherein the processor is further configured to:
route traffic to and from the end device via the subnetwork slice connection.

13. The network device of claim 9, wherein the request is a Dynamic Host Configuration Protocol request.

14. The network device of claim 9, wherein the processor is further configured to:
receive from a first network device after the determination, a message indicating that the end device is authorized to use the network slice service.

15. The network device of claim 9, wherein the processor is further configured to:
transmit to the end device, a response that includes the network address allocated for the network slice service.

16. The network device of claim 9, wherein the fixed wireless access device is customer premises equipment that includes at least one of a wireless router or a wireless modem.

17. A non-transitory computer-readable storage medium storing instructions executable by a processor of a fixed wireless access device that is not a base station, wherein the instructions are configured to:
receive from an end device, a request for a network address assignment, wherein the end device is not a fifth generation (5G) compatible device;
determine, based on the request, that the end device is subject to a network slice service that includes a network slice connection between the fixed wireless access device and a 5G radio access network (RAN) device;
establish a subnetwork slice connection with the 5G RAN device; and
assign to the end device, a network address allocated for the network slice service.

18. The non-transitory computer-readable storage medium of claim 17, wherein the instructions are further configured to:
transmit an authorization request, which pertains to the end device and the network slice service, to a core device.

19. The non-transitory computer-readable storage medium of claim 17, wherein the request is a Dynamic Host Configuration Protocol request.

20. The non-transitory computer-readable storage medium of claim 17, wherein the fixed wireless access device is customer premises equipment that includes at least one of a wireless router or modem.

\* \* \* \* \*